(12) United States Patent
Ikeda et al.

(10) Patent No.: US 11,400,979 B2
(45) Date of Patent: Aug. 2, 2022

(54) FRAME OF VEHICLE

(71) Applicant: Toyota Jidosha Kabushiki Kaisha, Toyota (JP)

(72) Inventors: Yozo Ikeda, Toyota (JP); Kenji Imai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/909,605

(22) Filed: Jun. 23, 2020

(65) Prior Publication Data
US 2020/0406972 A1 Dec. 31, 2020

(30) Foreign Application Priority Data

Jun. 28, 2019 (JP) .............................. JP2019-121207

(51) Int. Cl.
| | | |
|---|---|---|
| *B60J 7/00* | (2006.01) | |
| *B62D 21/02* | (2006.01) | |
| *B62D 21/15* | (2006.01) | |
| *B62D 25/02* | (2006.01) | |
| *B62D 25/20* | (2006.01) | |
| *B62D 24/00* | (2006.01) | |

(52) U.S. Cl.
CPC ........... *B62D 21/02* (2013.01); *B62D 21/152* (2013.01); *B62D 24/00* (2013.01); *B62D 25/025* (2013.01); *B62D 25/2036* (2013.01)

(58) Field of Classification Search
CPC .... B62D 33/0604; B62D 35/001; B62D 1/28; B60R 21/11; B65F 2003/0279; B60P 3/07; B60P 3/08; G07B 15/063; G01S 13/931; G01C 21/28
See application file for complete search history.

(56) References Cited

U.S. PATENT DOCUMENTS

| | | | | | |
|---|---|---|---|---|---|
| 4,412,635 A | * | 11/1983 | Bateman | ................... | B60R 9/06 224/520 |
| 4,978,014 A | * | 12/1990 | Humitz | .................. | B65D 19/12 108/54.1 |
| 6,089,816 A | * | 7/2000 | Christ | ..................... | B60P 3/122 414/500 |

(Continued)

FOREIGN PATENT DOCUMENTS

| | | |
|---|---|---|
| CN | 205632663 U | 10/2016 |
| JP | 2016-094172 A | 5/2016 |
| KR | 20100058973 A | 6/2010 |

*Primary Examiner* — Kiran B Patel
(74) *Attorney, Agent, or Firm* — Dinsmore & Shohl LLP

(57) ABSTRACT

The frame of a vehicle includes side rails disposed on the respective left and right sides of the vehicle and extending along the longitudinal direction of the vehicle, a lower cross member connected to the end portions of the side rails and extending along the lateral direction of the vehicle, an upper cross member positioned above the lower cross member and extending parallel to the lower cross member, vertical members extending in the vertical direction of the vehicle on the respective both end portions of the lower cross member and of the upper cross member, to be connected to the lower cross member and the upper cross member; and side members connected to the upper cross member, and extending on the respective right and left sides of the vehicle from the upper cross member to a side opposite from the side rails along the longitudinal direction of the vehicle.

3 Claims, 3 Drawing Sheets

(56) References Cited

U.S. PATENT DOCUMENTS

| | | | | |
|---|---|---|---|---|
| 6,367,869 B1* | 4/2002 | Baccouche | | B62D 21/155 |
| | | | | 280/784 |
| 6,502,883 B2* | 1/2003 | Rice | | F16F 15/08 |
| | | | | 296/35.1 |
| 7,048,265 B2* | 5/2006 | Huprikar | | F16F 1/3732 |
| | | | | 267/141.1 |
| 7,364,223 B2* | 4/2008 | Mori | | B62D 33/0604 |
| | | | | 296/190.07 |
| 9,764,775 B2* | 9/2017 | Daigaku | | B62D 25/025 |
| 11,104,381 B2* | 8/2021 | Ikeda | | B62D 21/03 |
| 2006/0181056 A1* | 8/2006 | Weekes | | B60P 3/1033 |
| | | | | 280/414.1 |
| 2016/0137228 A1* | 5/2016 | Atsumi | | B62D 25/20 |
| | | | | 296/204 |
| 2017/0113728 A1* | 4/2017 | Garay Serrano | | B62D 21/02 |
| 2018/0272852 A1* | 9/2018 | Ajisaka | | B60K 1/04 |
| 2018/0370577 A1* | 12/2018 | Takahashi | | B62D 25/2036 |
| 2019/0023321 A1* | 1/2019 | Ayukawa | | B62D 25/2045 |
| 2019/0039446 A1* | 2/2019 | Koike | | B60K 15/07 |
| 2019/0276080 A1* | 9/2019 | Otoguro | | B62D 25/20 |
| 2020/0079429 A1* | 3/2020 | Asai | | B62D 21/03 |
| 2020/0406735 A1* | 12/2020 | Nagaya | | B62D 21/03 |
| 2020/0406736 A1* | 12/2020 | Hattori | | B60L 50/66 |
| 2020/0406764 A1* | 12/2020 | Konno | | B60L 53/16 |
| 2020/0406802 A1* | 12/2020 | Shitara | | B62D 31/00 |
| 2020/0406935 A1* | 12/2020 | Yamanouchi | | B60K 35/00 |
| 2020/0406973 A1* | 12/2020 | Nagaya | | B60R 16/04 |
| 2020/0406974 A1* | 12/2020 | Ikeda | | B62D 25/2036 |
| 2020/0406975 A1* | 12/2020 | Nagaya | | B62D 31/02 |
| 2020/0406976 A1* | 12/2020 | Shioya | | B62D 21/07 |
| 2021/0039716 A1* | 2/2021 | Sasaoka | | B62D 25/2036 |
| 2021/0138953 A1* | 5/2021 | Yabushita | | B60N 2/005 |
| 2021/0155146 A1* | 5/2021 | Yabushita | | B65G 67/20 |
| 2021/0261202 A1* | 8/2021 | Kawashima | | B62D 25/20 |

* cited by examiner

FRAME OF VEHICLE

CROSS REFERENCE TO RELATED APPLICATION

This application claims priority to Japanese Patent Application No. 2019-121207 filed on Jun. 28, 2019 which is incorporated herein by reference in its entirety including the specification, claims, drawings, and abstract.

TECHNICAL FIELD

This disclosure relates to the frame of a vehicle, on which a body is to be mounted, more particularly, the structure of the frame.

BACKGROUND

Vehicles having a separate structure including a frame and a body mounted on the frame have been known. As one example of the frame, a frame, or a so-called ladder frame, including a first longitudinal member and a second longitudinal member disposed on the respective right and left sides of the vehicle and extending in the longitudinal direction of the vehicle and a plurality of lateral members extending in the lateral direction of the vehicle and connected to the first and second longitudinal members is known.

JP 2016-94172 A discloses a ladder frame including first and second side rails (14) disposed on the respective left and right sides of a vehicle and extending in the longitudinal direction of the vehicle, and a plurality of cross members (22, 24, 26) extending in the lateral direction of the vehicle and connected to the first and second side rails (14) at their respective end portions. Note that the reference numerals in the parentheses above are those used in JP 2016-94172 A, but not related to the names and numbers of the members used in the description of this embodiment in this application.

In situations wherein the cabin of a vehicle, or a space inside the body of the vehicle, must to a certain extent have a larger height or wherein the cabin of a vehicle must have a low floor so that passengers may readily board or exit the vehicle, it is necessary that the longitudinal members of the frame be disposed at lower positions. Simultaneously, in order to dispose the arms of a suspension for suspending wheels, the rods of a steering device, or a drive shaft, or to allow for the movement of these components, the longitudinal members of the frame must to a certain extent be disposed in higher positions near the wheels. However, if a frame includes portions positioned at different heights, the strength and rigidity of the portions connecting these portions may decrease.

SUMMARY

This disclosure proposes a structure of a frame that ensures high strength and rigidity even when the cabin of a vehicle has a low floor.

A frame of a vehicle on which a body is to be mounted according to this disclosure includes a first side rail and a second side rail disposed on the respective left and right sides of the vehicle and extending along the longitudinal direction of the vehicle; a lower cross member connected to the end portions of the first side rail and of the second side rail, and extending along the lateral direction of the vehicle; an upper cross member positioned above the lower cross member and extending parallel to the lower cross member; a first vertical member and a second vertical member extending in the vertical direction of the vehicle on the respective both end portions of the lower cross member and of the upper cross member to be connected to the lower cross member and the upper cross member; and a first side member and a second side member disposed on the respective left and right sides of the vehicle, connected to the upper cross member, and extending from the upper cross member to a side opposite from the first side rail and the second side rail along the longitudinal direction of the vehicle.

The first and second side rails are connected to the first and second side members with the upper and lower cross members and the first and second vertical members, which are connected to one another so as to define a rectangular frame shape, so that a cabin having a low floor and a highly strong and rigid frame can both be achieved.

The frame of a vehicle according to this disclosure may further include a first reinforcement member extending diagonally relative to the longitudinal direction of the vehicle and connected to the first side member and the lower cross member or the first vertical member, and a second reinforcement member extending diagonally relative to the longitudinal direction of the vehicle and connected to the second side member and the lower cross member or the second vertical member.

The diagonal reinforcement member can transmit a collision load inputted to the side members from a distant position in the longitudinal direction of the vehicle, to the side rails.

The frame of a vehicle according to this disclosure may further include an additional vertical member disposed between the respective both end portions of the lower cross member and of the upper cross member, and connected to the lower cross member and the upper cross member.

The additional vertical member can enhance the strength and rigidity of the portions connecting the first and second side rails and the first and second side members.

BRIEF DESCRIPTION OF DRAWINGS

An embodiment of this disclosure will be described based on the following figures, wherein.

DESCRIPTION OF EMBODIMENTS

Figure 1:
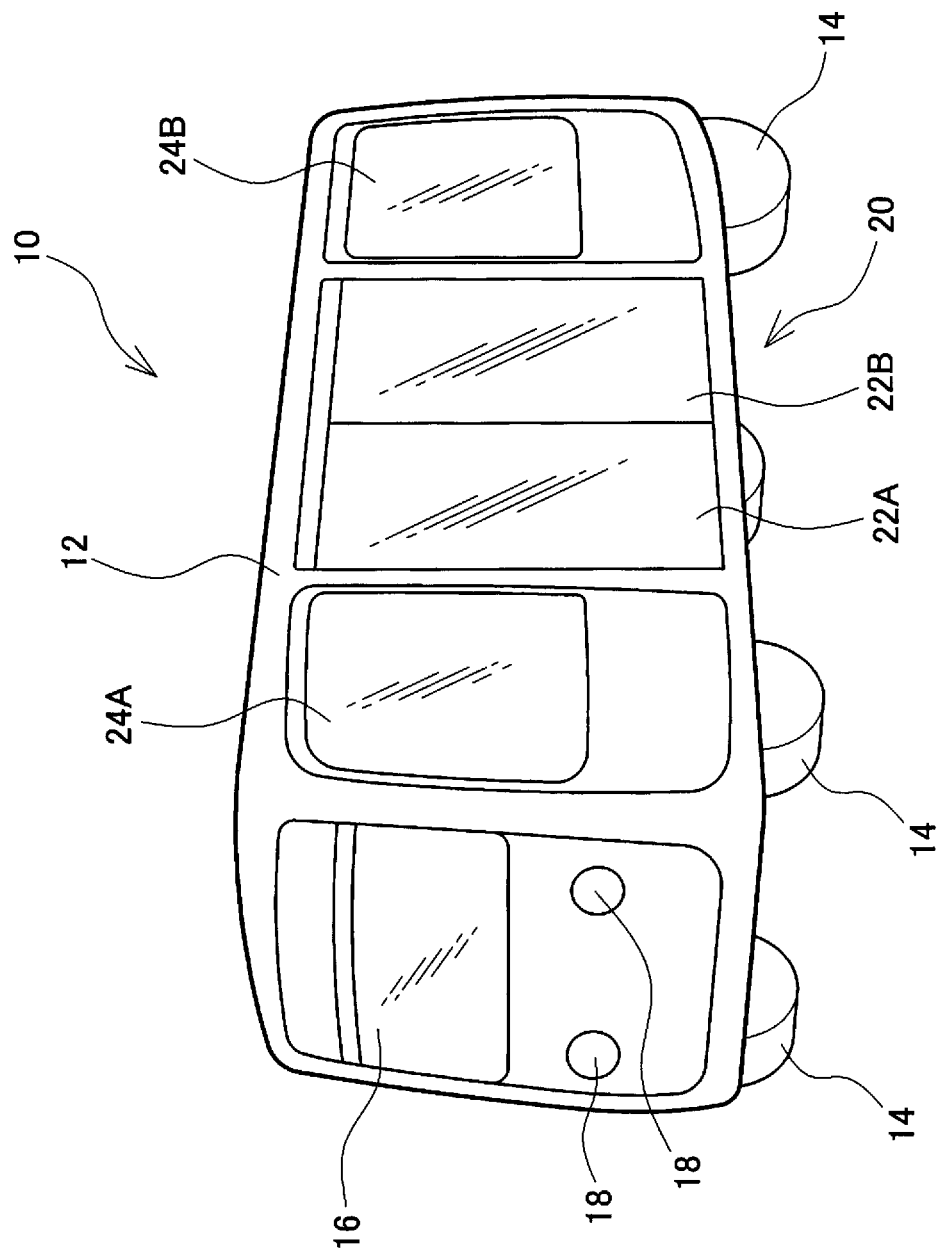
FIG. 1 illustrates the external appearance of a vehicle according to this embodiment.

An embodiment will now be described referring to the drawings. Note that terms such as front, forward, rear, rearward, left, leftward, right, rightward, up, upward, down (low), downward, and so forth, that indicate relative positions and directions indicate those relevant to a vehicle unless otherwise stated. A direction extending in the front-rear direction of a vehicle will be defined as a longitudinal direction. A direction extending in the right-left direction is defined as a lateral direction. A direction extending in the up-down direction is defined as a vertical direction. In the respective drawings, an arrow FR points out the forward direction, an arrow UP points out the upward direction, and an arrow LH points out the leftward direction.

FIG. 1 is a schematic perspective view of the external appearance of a vehicle 10. The vehicle 10 has a body 12 shaped like a substantially rectangular parallelepiped. The body 12 is longest in the front-rear direction, and secondly in the vertical direction. The body 12 includes wheels 14 at respective four corners. In an upper portion on the front surface of the body 12, a wind-sealed glass 16 is disposed. On the right and left sides in a lower portion of the front surface of the body 12, head lamps 18 are disposed. On the rear surface of the body 12, a back window glass (not illustrated) having the same shape as that of the wind-sealed glass 16 on the front surface is disposed, and rear combination lamps (not illustrated) are disposed at the same positions as those of the head lamps 18 on the front surface.

On a side surface of the body 12, a boarding door 20 is disposed. The door 20 is disposed on one side surface of the body 12. Specifically, in vehicles for use in regions for left-hand traffic, the door 20 is disposed on the left side surface, while, in vehicles for use in regions for right-hand traffic, the door 20 is disposed on the right side surface. Alternatively, a door 20 may be disposed on both side surfaces. The door 20 includes two door panels 22A, 22B, that slide along the longitudinal direction of the vehicle. That is, the door panels 22A, 22B slide to open or close. On each of the door panels 22A, 22B, a door glass is provided, and a door window is formed. The door 20 is disposed at the substantial middle of the side surface of the body 12 in the longitudinal direction of the vehicle, with side window glass panels 24A, 24B disposed forward and rearward of the door 20, respectively, to thereby form side windows. On the side surface without the door 20, a side window is formed over the substantially full length of the body 12 in the longitudinal direction.

Figure 2:
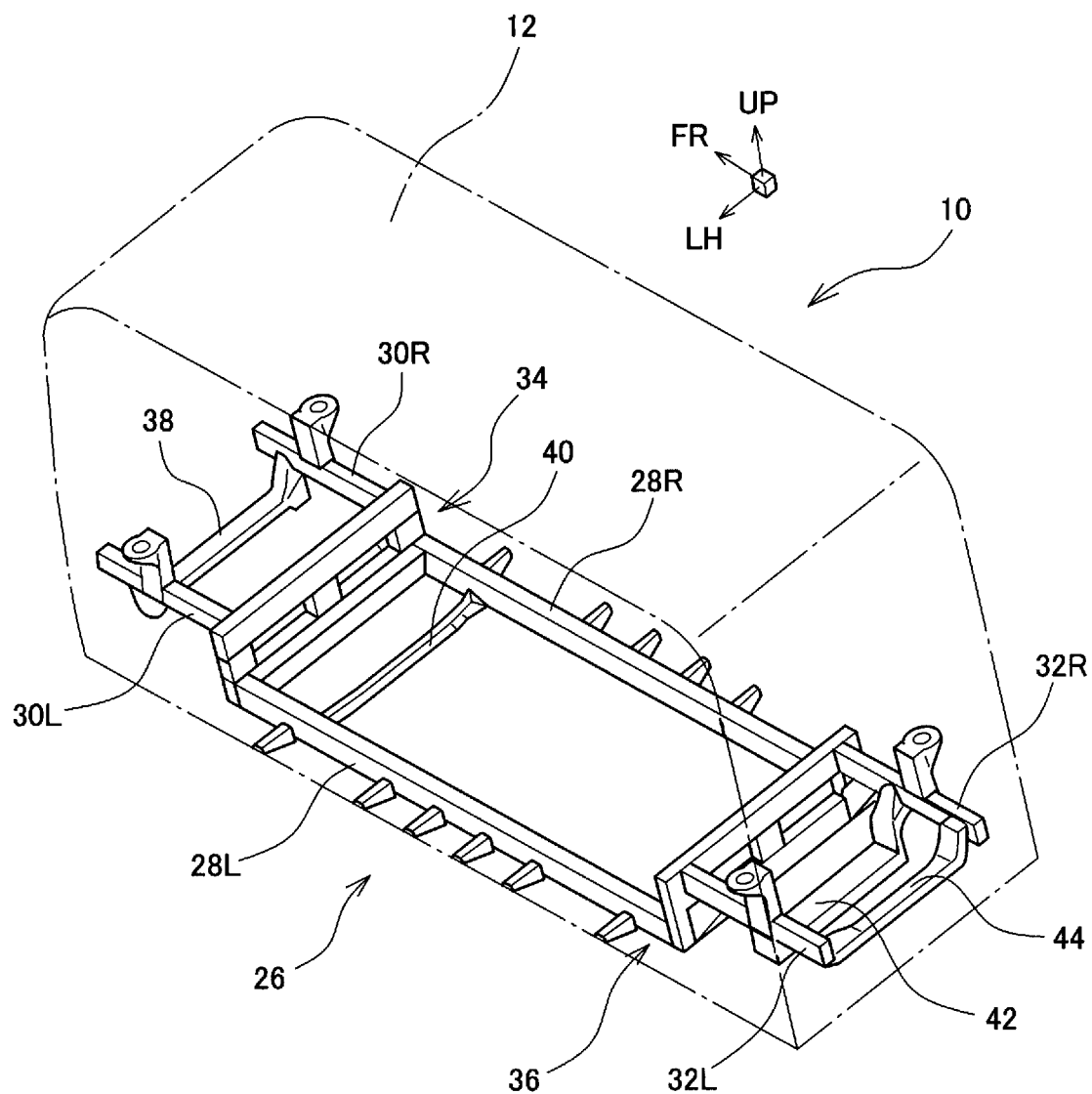
FIG. 2 illustrates the frame of a vehicle.

FIG. 2 is a perspective view of the vehicle 10, illustrating a frame 26 on which the body 12 is mounted, in which the outer shape of the body 12 is illustrated with a dotted broken line, with wheels, a suspension, a drive force device, or the like, not illustrated. The frame 26 includes a pair of side rails 28R, 28L, a pair of front side members 30R, 30L, and a pair of rear side members 32R, 32L. The side rails 28R, 28L are disposed on the respective right and left sides of the middle portion of the vehicle and extending in the longitudinal direction. The pair of front side members 30R, 30L and the pair of rear side members 32R, 32L are disposed in the front and rear portions of the vehicle, respectively. The respective side members constituting each pair extend in the longitudinal direction on the respective right and left sides of the vehicle. The frame 26 further includes a front connection portion 34 that connects the side rails 28R, 28L and the front side members 30R, 30L, and a rear connection portion 36 that connects the side rails 28R, 28L and the rear side members 32R, 32L. The front and rear connection portions 34, 36 extend in the lateral direction, and function as cross members that connect the right and left side rails 28R, 28L and the right and left front side members 30R, 30L, and the right and left rear side rails 28R, 28L and the right and left rear side members 32R, 32L, respectively. The frame 26 includes some cross members 38, 40, 42, 44 in addition to the front and rear connection portions 34, 36. The frame 26 has an overall ladder shape.

Figure 3:
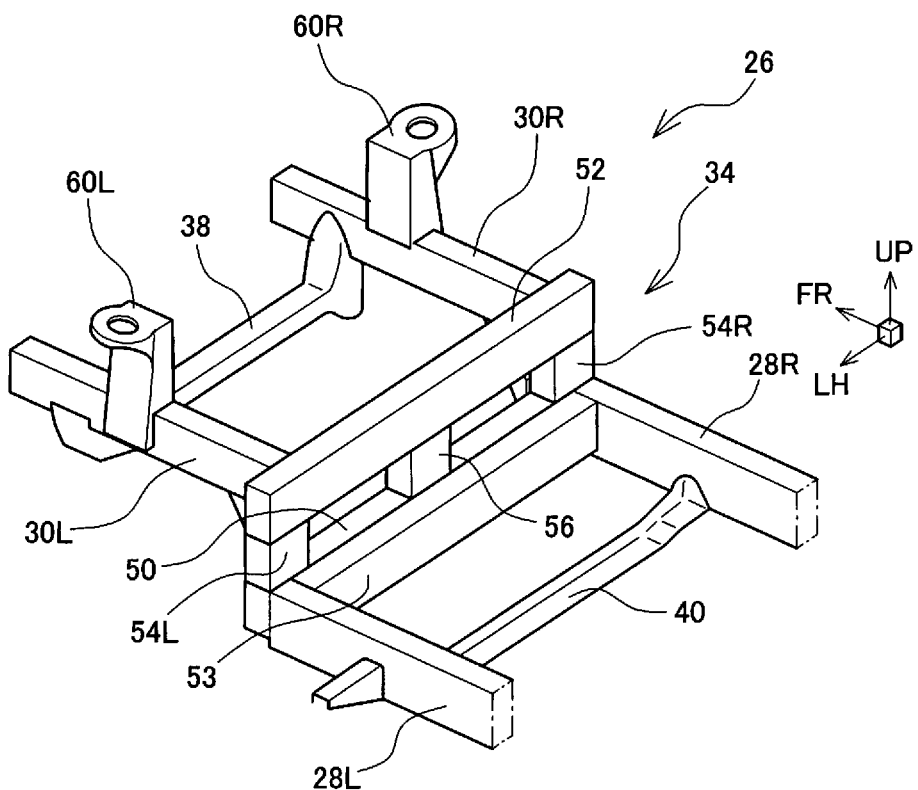
FIG. 3 is an enlarged view of the structure of the front portion of a frame, viewed from above rear thereof.
Figure 4:
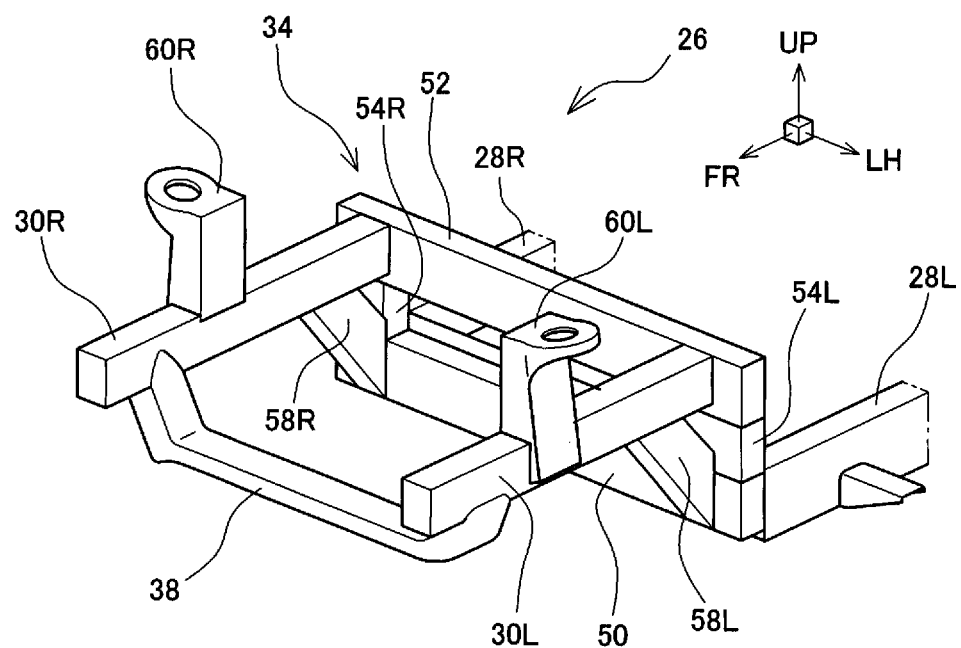
FIG. 4 is an enlarged view of the structure of the front portion of a frame, viewed from above front thereof.

FIG. 3 and FIG. 4 are enlarged views of the structure of the front portion of the frame 26. The front connection portion 34 includes a lower cross member 50 and an upper cross member 52 extending parallel to each other in the lateral direction, and further a pair of vertical members 54R, 54L disposed on the respective end portions of the lower and upper cross members 50, 52 so as to extend in the up-down direction to be connected to the lower and upper cross members 50, 52. In addition to the vertical members 54R, 54L on the respective end portions, one or more additional vertical members 56 may be provided between the vertical members 54R, 54L. The additional vertical member 56 also extends in the vertical direction to be connected to the lower and upper cross members 50, 52. In the vehicle 10, a single additional vertical member 56 is disposed at the middle of the vehicle 10 in the lateral direction. The lower cross member 50, the upper cross member 52, and the vertical members 54R, 54L together constitute a rectangular frame structure.

The lower cross member 50 is connected to the front end portions of the right and left side rails 28R, 28L on its respective end portions. The upper cross member 52 is positioned above and spaced apart from the lower cross member 50. An additional lower cross member 53 may be provided adjacent to the lower cross member 50 and extending in the lateral direction. The additional lower cross member 53 is also connected to the side rails 28R, 28L on its respective end portions. The front side members 30R, 30L extend forward from the upper cross member 52, that is, to a side opposite from the side rails 28R, 28L relative to the front connection portion 34. A portion of the front connection portion 34 corresponding to the lower edge portion of the rectangular frame structure constituted by the front connection portion 34 is connected to the side rails 28R, 28L, and a portion corresponding to the upper edge portion is connected to the front side members 30R, 30L. Between the front side members 30R, 30L and the lower cross member 50 or the vertical members 54R, 54L, reinforcement members 58R, 58L are provided extending diagonally relative to the longitudinal direction. The reinforcement members 58R, 58L transmit a collision load applied from the front side, to the side rails 28R, 28L. Suspension towers 60R, 60L are provided on, and standing from, the front side members 30R, 30L, respectively, to serve as respective upper mount points of the dampers and springs of the suspension.

The front side members 30R, 30L are positioned slightly more inward than the side rails 28R, 28L in the lateral direction of the vehicle to ensure a space for disposition of the wheels 14. The front side members 30R, 30L are simultaneously positioned higher than the side rails 28R, 28L to ensure a space for disposition of the arms of the suspension, in particular, the lower arms, the tie-rods of a steering device, a drive shaft, and so forth.

The structure of the rear connection portion 36 and a portion therearound is longitudinally symmetrical to the front connection portion 34, and not described here.

Using the front and rear connection portions 34, 36, it is possible to connect the side rails 28R, 28L, the front side members 30R, 30L, and the rear side members 32R, 32L at different heights. This enables a cabin having a low floor. In addition, the rectangular frame shape of each of the front and rear connection portions 34, 36 can enhance the strength and rigidity of the front and rear connection portions 34, 36, which can enhance the overall strength and rigidity of the frame 26.

Each of the above-described front and rear connection portions 34, 36 has a rectangular frame structure constituted by two upper and lower members extending in the lateral direction (the lower and upper cross members 50, 52) and two members (the vertical members 54R, 54L) disposed between the two members and extending in the vertical direction. Alternatively, each of the front and rear connection portions 34, 36 may have a frame structure constituted by two members extending in the vertical direction and two members disposed between the two members and extending in the lateral direction.

The invention claimed is:

1. A frame of a vehicle on which a body is to be mounted, comprising:
    a first side rail and a second side rail disposed on respective left and right sides of the vehicle and extending along a longitudinal direction of the vehicle;
    a lower cross member connected to end portions of the first side rail and of the second side rail, and extending along a lateral direction of the vehicle;
    an upper cross member positioned above the lower cross member and extending parallel to the lower cross member;
    a first vertical member and a second vertical member extending in a vertical direction of the vehicle on respective both end portions of the lower cross member and of the upper cross member to be connected to the lower cross member and the upper cross member; and
    a first side member and a second side member disposed on respective left and right sides of the vehicle, connected to the upper cross member, and extending from the upper cross member to a side opposite from the first side rail and the second side rail along the longitudinal direction of the vehicle.

2. The frame of a vehicle according to claim 1, further comprising:
    a first reinforcement member extending diagonally relative to the longitudinal direction of the vehicle and connected to the first side member and the lower cross member or the first vertical member, and
    a second reinforcement member extending diagonally relative to the longitudinal direction of the vehicle and connected to the second side member and the lower cross member or the second vertical member.

3. The frame of a vehicle according to claim 1, further comprising an additional vertical member disposed between respective both end portions of the lower cross member and of the upper cross member, and connected to the lower cross member and the upper cross member.

* * * * *

UNITED STATES PATENT AND TRADEMARK OFFICE
CERTIFICATE OF CORRECTION

| | | |
|---|---|---|
| PATENT NO. | : 11,400,979 B2 | Page 1 of 1 |
| APPLICATION NO. | : 16/909605 | |
| DATED | : August 2, 2022 | |
| INVENTOR(S) | : Ikeda et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 123 days.

Signed and Sealed this
Fourth Day of July, 2023

Katherine Kelly Vidal
*Director of the United States Patent and Trademark Office*